US010698737B2

(12) United States Patent
Fachini et al.

(10) Patent No.: US 10,698,737 B2
(45) Date of Patent: Jun. 30, 2020

(54) INTEROPERABLE NEURAL NETWORK OPERATION SCHEDULER

(71) Applicant: HEWLETT PACKARD ENTERPRISE DEVELOPMENT LP, Palo Alto, CA (US)

(72) Inventors: Guilherme James De Angelis Fachini, Porto Alegre (BR); Dejan S. Milojicic, Palo Alto, CA (US); Gustavo Henrique Rodrigues Pinto Tomas, Barueri (BR); Francisco Plinio Oliveira Silveira, Porto Aegre (BR)

(73) Assignee: Hewlett Packard Enterprise Development LP, Houston, TX (US)

( * ) Notice: Subject to any disclaimer, the term of this patent is extended or adjusted under 35 U.S.C. 154(b) by 218 days.

(21) Appl. No.: 15/963,548

(22) Filed: Apr. 26, 2018

(65) Prior Publication Data

US 2019/0332441 A1 Oct. 31, 2019

(51) Int. Cl.
*G06F 9/46* (2006.01)
*G06F 9/50* (2006.01)
(Continued)

(52) U.S. Cl.
CPC .......... *G06F 9/5055* (2013.01); *G06F 9/4881* (2013.01); *G06F 9/5044* (2013.01); *G06N 3/04* (2013.01); *G06N 5/046* (2013.01)

(58) Field of Classification Search
CPC .... G06F 9/5055; G06F 9/5044; G06F 9/4881; G06N 3/04; G06N 5/046; G06N 3/063; G06N 3/0454; G06N 3/105
See application file for complete search history.

(56) References Cited

U.S. PATENT DOCUMENTS 5,437,032 A * 7/1995 Wolf .................... G06F 9/4881
   718/103
5,506,987 A * 4/1996 Abramson ............ G06F 9/5033
   718/103
(Continued)

OTHER PUBLICATIONS

Babu, K.R.R. et al.; "Task Scheduling Using Aco-bp Neural Network in Computational Grids"; Aug. 3-5, 2012; 5 pages.
(Continued)

*Primary Examiner* — Adam Lee
(74) *Attorney, Agent, or Firm* — Nolte Intellectual Property Law Group

(57) ABSTRACT

A Neural Network (NN) scheduler and techniques to implement features of different possible NN schedulers are disclosed. In a first example, an NN scheduler that accepts NN models in an interoperable format and performs optimizations on this interoperable format as part of converting it to a run-time format is provided. In a second example, an NN scheduler analyzes operations and annotations associated with those operations to determine scheduling options based on hardware availability, data availability, hardware efficiency, processor affinity, etc. In a third example, an NN scheduler that may be integrated with a feed-back loop to recognize actual run-time attributes may be used to "learn" and adapt to change its future scheduling behavior. Each of these examples may be integrated individually, or together, to provide an NN scheduler that optimizes and adapts processing functions for an NN model either prior to processing or for just-in-time determination of operation scheduling.

20 Claims, 11 Drawing Sheets

(51) Int. Cl.
  *G06F 9/48* (2006.01)
  *G06N 5/04* (2006.01)
  *G06N 3/04* (2006.01)

(56) References Cited

U.S. PATENT DOCUMENTS

| | | | | |
|---|---|---|---|---|
| 5,826,079 A * | 10/1998 | Boland | | G06F 9/5033 718/102 |
| 5,872,972 A * | 2/1999 | Boland | | G06F 9/5033 718/102 |
| 6,243,788 B1 * | 6/2001 | Franke | | G06F 9/5033 711/3 |
| 6,269,390 B1 * | 7/2001 | Boland | | G06F 9/4881 711/120 |
| 6,453,376 B1 * | 9/2002 | Fairman | | G06F 9/485 709/223 |
| 6,782,410 B1 * | 8/2004 | Bhagat | | G06F 9/5027 709/201 |
| 6,901,522 B2 * | 5/2005 | Buch | | G06F 1/3203 713/320 |
| 6,925,642 B1 * | 8/2005 | Commander | | G06F 9/5044 709/201 |
| 6,988,139 B1 * | 1/2006 | Jervis | | G06F 9/5038 709/224 |
| 6,996,822 B1 * | 2/2006 | Willen | | G06F 9/5033 711/100 |
| 7,069,558 B1 * | 6/2006 | Stone | | G06F 9/485 718/100 |
| 7,093,258 B1 * | 8/2006 | Miller | | G06F 9/485 718/105 |
| 7,111,300 B1 * | 9/2006 | Salas | | G06F 9/5027 709/203 |
| 7,318,128 B1 * | 1/2008 | Dice | | G06F 9/5033 711/151 |
| 7,596,788 B1 * | 9/2009 | Shpigelman | | G06F 9/50 718/100 |
| 7,644,408 B2 * | 1/2010 | Kroening | | G06F 9/5072 709/201 |
| 7,996,696 B1 * | 8/2011 | Haney | | G06F 1/3287 713/324 |
| 8,005,101 B1 * | 8/2011 | Kleyman | | H04L 45/60 370/389 |
| 8,104,038 B1 * | 1/2012 | Graupner | | G06F 9/5044 718/104 |
| 8,332,862 B2 * | 12/2012 | Isard | | G06F 8/433 709/201 |
| 8,341,623 B2 * | 12/2012 | Korupolu | | G06F 9/5066 709/223 |
| 8,412,822 B1 * | 4/2013 | Weinman, Jr. | | G06F 9/4843 709/225 |
| 8,799,904 B2 * | 8/2014 | Kuiper | | G06F 9/4812 717/127 |
| 8,914,515 B2 * | 12/2014 | Alapati | | G06F 9/5072 709/224 |
| 2002/0143965 A1 * | 10/2002 | Aiken, Jr. | | G06F 9/5033 709/229 |
| 2003/0014510 A1 * | 1/2003 | Avvari | | G06F 9/5055 709/223 |
| 2003/0018691 A1 * | 1/2003 | Bono | | G06F 9/4881 718/106 |
| 2003/0229662 A1 * | 12/2003 | Luick | | G06F 1/206 718/106 |
| 2004/0064829 A1 * | 4/2004 | Pallister | | G06F 9/5044 719/327 |
| 2004/0250248 A1 * | 12/2004 | Halpern | | G06F 9/5033 718/100 |
| 2005/0081208 A1 * | 4/2005 | Gargya | | G06F 9/4881 718/100 |
| 2006/0130064 A1 * | 6/2006 | Srivastava | | H04L 45/50 718/102 |
| 2006/0168586 A1 * | 7/2006 | Stone | | G06F 9/485 718/104 |
| 2006/0230405 A1 * | 10/2006 | Fraenkel | | G06F 9/5027 718/104 |
| 2007/0130208 A1 * | 6/2007 | Bornhoevd | | G06F 9/485 |
| 2007/0168970 A1 * | 7/2007 | Li | | G06F 9/5038 717/124 |
| 2007/0271563 A1 * | 11/2007 | Anand | | G06F 9/5033 718/100 |
| 2008/0046500 A1 * | 2/2008 | Kato | | G06F 9/5044 709/201 |
| 2008/0196030 A1 * | 8/2008 | Buros | | G06F 9/5033 718/102 |
| 2008/0208372 A1 | 8/2008 | Pannese | | |
| 2009/0187909 A1 * | 7/2009 | Russell | | G06F 9/5027 718/102 |
| 2009/0210649 A1 * | 8/2009 | Wan | | G06F 9/30087 711/170 |
| 2009/0320022 A1 * | 12/2009 | Ries | | G06F 9/5033 718/100 |
| 2010/0017804 A1 * | 1/2010 | Gupta | | G06F 9/5033 718/102 |
| 2010/0058352 A1 * | 3/2010 | Esfahany | | G06F 9/505 718/105 |
| 2010/0077185 A1 * | 3/2010 | Gopalan | | G06F 9/5033 712/220 |
| 2010/0115048 A1 * | 5/2010 | Scahill | | H04L 67/322 709/213 |
| 2010/0153956 A1 * | 6/2010 | Capps, Jr. | | G06F 9/5044 718/102 |
| 2010/0257538 A1 * | 10/2010 | Zhao | | G06F 9/4881 718/106 |
| 2010/0312891 A1 * | 12/2010 | Pairault | | G06F 16/9537 709/226 |
| 2010/0332796 A1 * | 12/2010 | Gaiarsa | | G06F 9/5016 712/30 |
| 2010/0332883 A1 * | 12/2010 | Saxe | | G06F 1/3203 713/324 |
| 2011/0078679 A1 * | 3/2011 | Bozek | | G06F 9/455 718/1 |
| 2011/0246804 A1 * | 10/2011 | Kaburlasos | | G06F 1/3203 713/340 |
| 2011/0276978 A1 * | 11/2011 | Gaiarsa | | G06F 9/46 718/104 |
| 2012/0054756 A1 * | 3/2012 | Arnold | | G06F 9/4881 718/102 |
| 2012/0072908 A1 * | 3/2012 | Schroth | | G06F 9/5033 718/1 |
| 2012/0110589 A1 * | 5/2012 | Ghosh | | G06F 9/5083 718/104 |
| 2012/0192191 A1 * | 7/2012 | Jellinek | | G06F 9/5044 718/102 |
| 2012/0226737 A1 * | 9/2012 | Rajaraman | | G06F 9/44526 709/203 |
| 2013/0074090 A1 * | 3/2013 | Kumar | | G06F 9/505 718/104 |
| 2013/0191843 A1 * | 7/2013 | Sarkar | | G06F 9/505 718/105 |
| 2014/0007129 A1 * | 1/2014 | Ye | | G06F 9/4856 718/104 |
| 2014/0047451 A1 * | 2/2014 | Archer | | G06F 9/5061 718/104 |
| 2014/0208072 A1 * | 7/2014 | Cadambi | | G06F 9/5044 712/31 |
| 2014/0208331 A1 * | 7/2014 | Li | | G06F 9/5044 718/105 |
| 2014/0282581 A1 * | 9/2014 | Vonteddu | | G06F 9/5011 718/104 |
| 2014/0380003 A1 * | 12/2014 | Hsu | | G06F 3/067 711/162 |
| 2015/0195153 A1 * | 7/2015 | Ahmed | | H04L 41/5054 709/226 |
| 2015/0242245 A1 * | 8/2015 | Brown | | G06F 9/528 718/105 |
| 2015/0347184 A1 * | 12/2015 | Kim | | G06F 9/4856 718/104 |
| 2015/0373093 A1 * | 12/2015 | Ashok | | G06F 9/45558 709/223 |

(56) References Cited

U.S. PATENT DOCUMENTS

| | | | |
|---|---|---|---|
| 2016/0048413 A1* | 2/2016 | Matsuyama | G06F 9/505 718/104 |
| 2016/0142485 A1* | 5/2016 | Mitkar | H04L 67/1097 707/681 |
| 2016/0259665 A1* | 9/2016 | Gaurav | G06F 9/5044 |
| 2016/0328269 A1* | 11/2016 | Minor | G06F 9/505 |
| 2017/0286181 A1* | 10/2017 | Daijavad | G06F 9/5044 |
| 2017/0315847 A1* | 11/2017 | Chen | G06F 11/3644 |
| 2018/0052693 A1* | 2/2018 | Sankaralingam | G06F 9/5044 |
| 2018/0131756 A1* | 5/2018 | Sarrazin-Boucher | G06F 9/4881 |
| 2018/0213037 A1* | 7/2018 | Roman | G06F 9/44505 |
| 2018/0225150 A1* | 8/2018 | Goldsack | G06F 9/5033 |
| 2018/0239651 A1* | 8/2018 | Gong | G06F 12/0813 |
| 2019/0042328 A1* | 2/2019 | Ortega | G06F 11/3013 |

OTHER PUBLICATIONS

Boyd, E.; "Microsoft and Facebook Create Open Ecosystem for Ai Model Interoperability"; Sep. 7, 2017; 4 pages.

Djurfeldt, M. et al; "Run-time Interoperability Between Neuronal Network Simulators Based on the Music Framework"; Mar. 2, 2010; 34 pages.

Janakiram, MSV; "Open Neural Network Exchange Project Aims to Bring Interoperability Among Deep Learning Frameworks"; Dec. 28, 2017; 5 pages.

Visalakshi, P. et al.; "Dynamic Task Scheduling with Load Balancing Using Hybrid Particle Swarm Optimization"; Sep. 2009; 14 pages.

Weckman, G.R. et al.; "A Neural Network Job-shop Scheduler"; Jan. 20, 2008; 11 pages.

* cited by examiner

INTEROPERABLE NEURAL NETWORK OPERATION SCHEDULER

BACKGROUND

In the field of neural networks (NNs), a variety of models and frameworks, are undergoing rapid and ongoing evolution. Such developments have led to the execution (training, testing, and inference) of NNs on different computational hardware. NNs are currently being developed on a variety of frameworks. A software framework can be thought of as a software environment (e.g., set of libraries, Application Programming Interfaces (APIs), and applications) that provides particular functionality as part of a larger software platform to facilitate development of software applications, products, and solutions, Software frameworks may include support programs, compilers, code libraries, tool sets, and application programming interfaces (APIs) that bring together all the different components to enable development of a project or system. A variety of different NN frameworks are commercially available and an appropriate framework may be selected based on the type of NN model (e.g., deep stacking, deep belief, convolutional, etc.) that may be implemented.

Concurrently with changes and availability of new software frameworks, multiple different hardware platforms that may be utilized, or even specialized, for running NN models are emerging to support the requirements of NN applications. These hardware platforms may be configured to take into account specifics of an NN's development and deployment. However, the current state of the widely used NN tools and frameworks do not appear to provide any intelligent mechanism to account for various computational requirements of NNs. Further, current NN tools may fail to perform comprehensive optimizations for the multitude of available platforms, frameworks, and hardware. As a result, there may be inefficiency in that any optimization designed for a first platform will likely not be applicable on a second platform. In short, optimizations across different execution environments may require different techniques. This is, in part, because an optimization technique for a first execution environment may be incompatible (or non-optimal) for a second execution environment due to differences in hardware and other factors.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1:
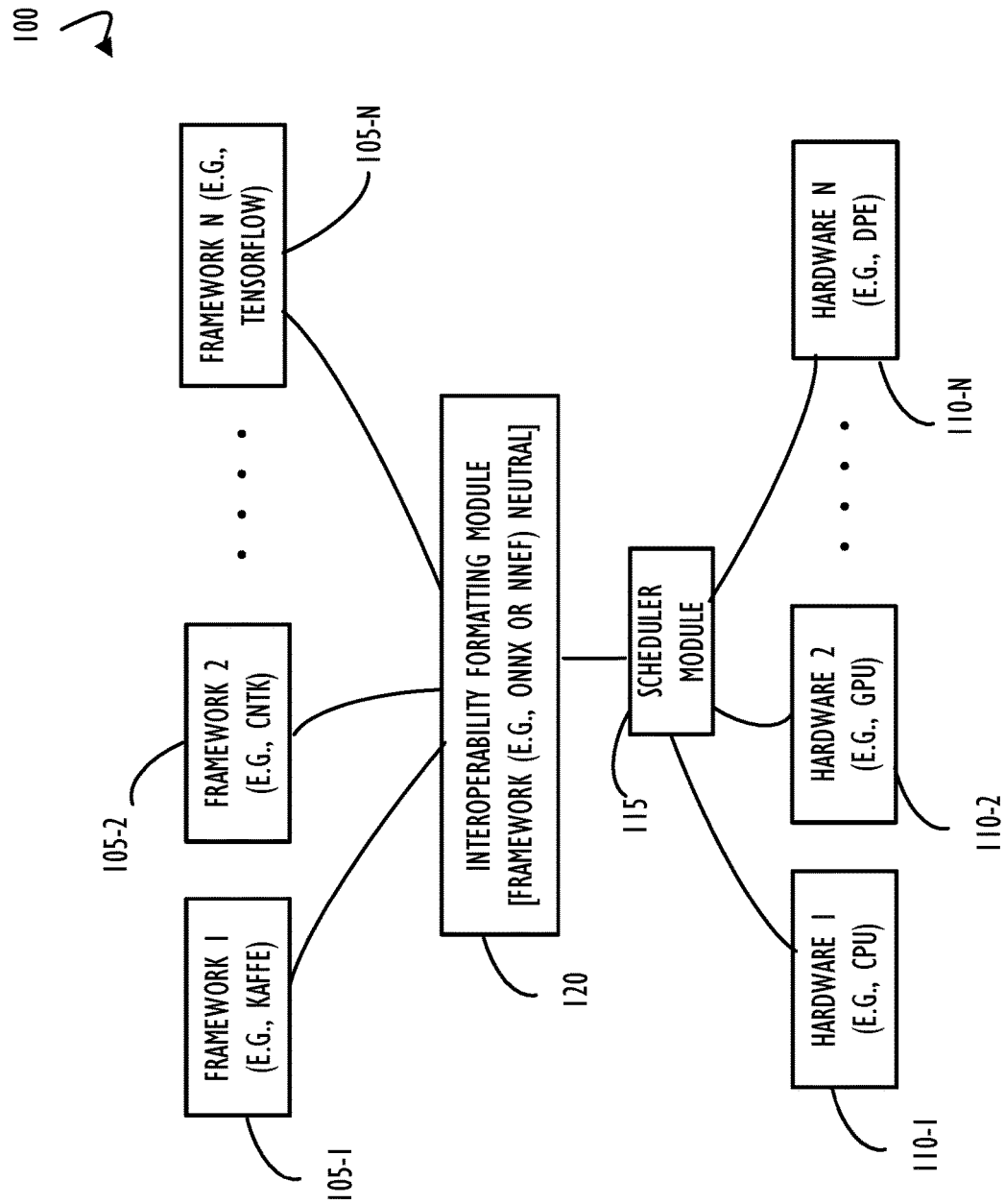
FIG. 1 is a functional block diagram of an NN processing system including a plurality of NN frameworks, a plurality of processing platforms upon which to perform the processing for the frameworks, and an operations scheduler module, according to one or more disclosed implementations.

NNs (NN) models and frameworks represent an area of technology that is currently evolving. As part of this evolution, enabling an NN's execution (training, testing, and inference) on different hardware represents one area where further improvements may be desirable. Today, NN models and systems are also being developed using a variety of software frameworks (e.g., TensorFlow, CNTK, Caffe2). Concurrently, with the availability of new software frameworks, multiple dedicated hardware platforms that may be specialized for running NN models are emerging. For example, Application Specific Integrated Circuits (ASICs), Graphics Processing Units (GPUs), Dot Product Engines (DPEs), etc. Specialization of these hardware platforms includes specific support for the processing of NNs, as well as, development and deployment of all or part of an NN. However, the current state of widely available tools and frameworks do not appear to provide a consistent intelligent mechanism for understanding, optimizing, and dispatching the workloads (e.g., jobs and/or operations described below) of the NNs. In one example, optimizations may be performed based on capabilities of the multitude of available platforms and hardware with respect to subsets of complete operation flows. As a result, optimizations for one platform may not be portable to a different platform. In conventional systems, this may result in a user having to repeat manual optimization techniques to leverage different platforms.

This disclosure relates to a scheduler that accepts NN models in an interoperable format (potentially enriched with annotated information) and optimizes the NN model. For example, optimize either the interoperable format, the NN model itself, or both. Next, the scheduler may decide where to execute potentially optimized portions of the NN model. For example, based on the available hardware which hardware may be best suited for an operation as determined using the annotated information. That is, the annotated information may provide information about underlying execution requirements that may indicate an affinity for a particular portion of an NN model to a particular type of hardware. Thus, development time may be reduced, while performance of the NN execution (either inference or training) may be optimized.

Different weighting factors may be used as part of this optimization of operations to hardware. For example, an available hardware element may be only slightly more optimal than a currently unavailable hardware element. As a result, the disclosed schedule may decide to execute on the slightly less efficient hardware element because its current availability outweighs the desire to wait for the more optimal (but currently unavailable) hardware element. Different weighting factors and tuning options may be present to allow configuration of a scheduler such that the scheduler makes desirable trade-offs for the whole system. That is, the scheduler may be tuned to optimize from an overall system perspective, rather than to perform an optimization focused only on a portion of the system. Of course, optimization on a per operation to hardware element match may represent a part of the overall optimization and be used in some implementations.

Prior approaches to NN model optimization and operation scheduling have included hardcoded priority of the operation execution over hardware platforms and pre-allocation of the model resources. In contrast, this disclosure presents advantages including but not limited to: 1) decreased development time; 2) improved performance; and 3) more efficient utilization of hardware. As further described herein, run-time optimization and scheduling of NN inference and training may be achieved, in part, through (i) establishing feedback loops at the scheduler level, and (ii) embedding of run-time information in the annotated models.

One aspect of the present disclosure refers to a device that accepts NNs in an interoperable format. The device then invokes a scheduler module to obtain or otherwise determine the current load and capability load of available hardware to execute the NNs. The scheduler module may derive the "best" currently available schedule (e.g., a best schedule based on current scheduler tuning parameters and job/operation criteria) for each of the NN operations. The device then converts the intermediary interoperable format of NN components to executable format for a specific hardware (e.g., the selected hardware). Next, the device initiates (or schedules) execution of different components based on the derived schedule.

In one possible implementation the scheduler may separate the operations declared in the NN model. Each operation may then be scheduled according to a classifier that will fit the operations into one of the available frameworks or hardware platforms for executing. The fit process may be configured to consider input/output overhead between different platforms and possibly operations affinity. Input/output overhead may include taking into account location of data (e.g., location within a network or device, its accessibility based on security restrictions) and throughput of hardware device to accommodate the type and volume of data expected for the operations accessing that data. Operations affinity may take into account requirements of operation with respect to capabilities of different hardware components and affinity with respect to other "near-by" operations that may be grouped together and dispatched together as operation groups (e.g., "jobs") instead of being dispatched independently.

In one possible implementation, the scheduler may group operations based on predefined criteria (e.g. data affinity, data proximity, operation type, initialization cost) into "jobs," instead of one operation per platform. This way, according to the overall affinity of the model to a selected platform, defined by the classifier, the operation groups (e.g., jobs) may be cross-compiled for execution on the target platform(s) as appropriate.

Some Implementations may utilize several types of classifiers, such as logistic classifiers or NNs with predetermined features (latency, data size, operation type, hardware model, etc.). Thus, a scheduler engine may be able to determine which operation will best fit (based on available information and weighting factors) the set of available hardware platforms. The model may be retrained, for example, using the disclosed feedback loop, based on each completed execution of individual operations (or jobs). To accomplish training, in one example, the system may use a dataset with defined features and labels to collect and categorize attributes of run-time execution for training. Training may be based on metrics and utilize machine learning techniques configured to analyze collected metrics and attributes.

A still further aspect of this disclosure refers to capturing the execution patterns of the deployed NN executable components, either operations or jobs, and using information derived or monitored from the execution patters to annotate the NN intermediary interoperable format for subsequent execution, effectively enabling a feedback loop.

In one implementation, a descriptor may be created for each operation (or job) as part of the scheduling phase (based on pre-execution information). This descriptor may be configured to maintain information for at least two sets of information. A first set of information may be used to refer to the operation's description, such as operation type (e.g. scalar, vector or matrix), its complexity (e.g. linear or quadratic), the recommended hardware settings to run it, data being handled, and so on. A second set of information may be the execution statistical data, for example, time to produce the output for a given hardware settings, resources used, the overhead to spawn the operation (e.g., startup or initialization cost) and so on.

In one possible implementation, each operation may be configured to maintain its own descriptors. In an alternate implementation, a helper task or monitoring task may be used to update one or more descriptors. Once the operation is completed, the corresponding descriptors may be made available with all determined run-time information populated, e.g., as an element of the descriptor. To make the descriptor available to the system, a publish-subscribe pattern might be used for loose coupling to other processes and functions and to possibly improve scalability. In one implementation, an additional component may be configured to query statistical data from running operations (e.g., an external monitor). For each query where the monitor determines new or additional information, a corresponding update may be made to the descriptor, for example, while the operation (or job) is still executing. In this manner, the descriptor may be kept current with information learned from a currently executing process. In addition to collecting information concurrent with execution, upon completion of an operation/job, statistical data may be collected and correlated for use by a patterns builder component.

A further aspect of this disclosure refers to the ability of a run-time device to adapt the NN workload execution using the annotated feedback of current and/or previous executions. Feedback information may be used for different purposes, including enabling a change of execution context for NN operations to fit into effective execution environments (e.g., better payload, lower energy cost, better performance, etc.).

As part of pre-execution analysis, operations may be characterized by a possible grouping mechanism and by using the annotations associated with the interoperable format, each described briefly above. Characterizations may be continuously updated and improved, in part, because some disclosed implementations keep annotations current with run-time information. In this manner it may be possible for a device (e.g., adaptive device) to leverage this annotation data to improve its execution context as well. In some implementations, the adaptive device could be configured to both modify the scheduler configuration to make the scheduler better understand the adaptive device capabilities or alter its own configuration to alter how it executes operations (e.g., through a device configuration change). In one possible case, an adaptive device may preempt an operation/job and request the scheduler to move that operation/job to another hardware type for execution. The adaptive device may be configured to utilize heuristics, machine learning algorithms, as well as other techniques, to be able to adapt itself based on "learned" information over time. In some implementations, the adaptive device may further identify a "reason for preemption" so that an application developer or system administrator may be able to tune the adaptive device in a manner that it may not accomplish through automatic self-configuration (e.g., add more physical memory, or data storage).

Figure 7:
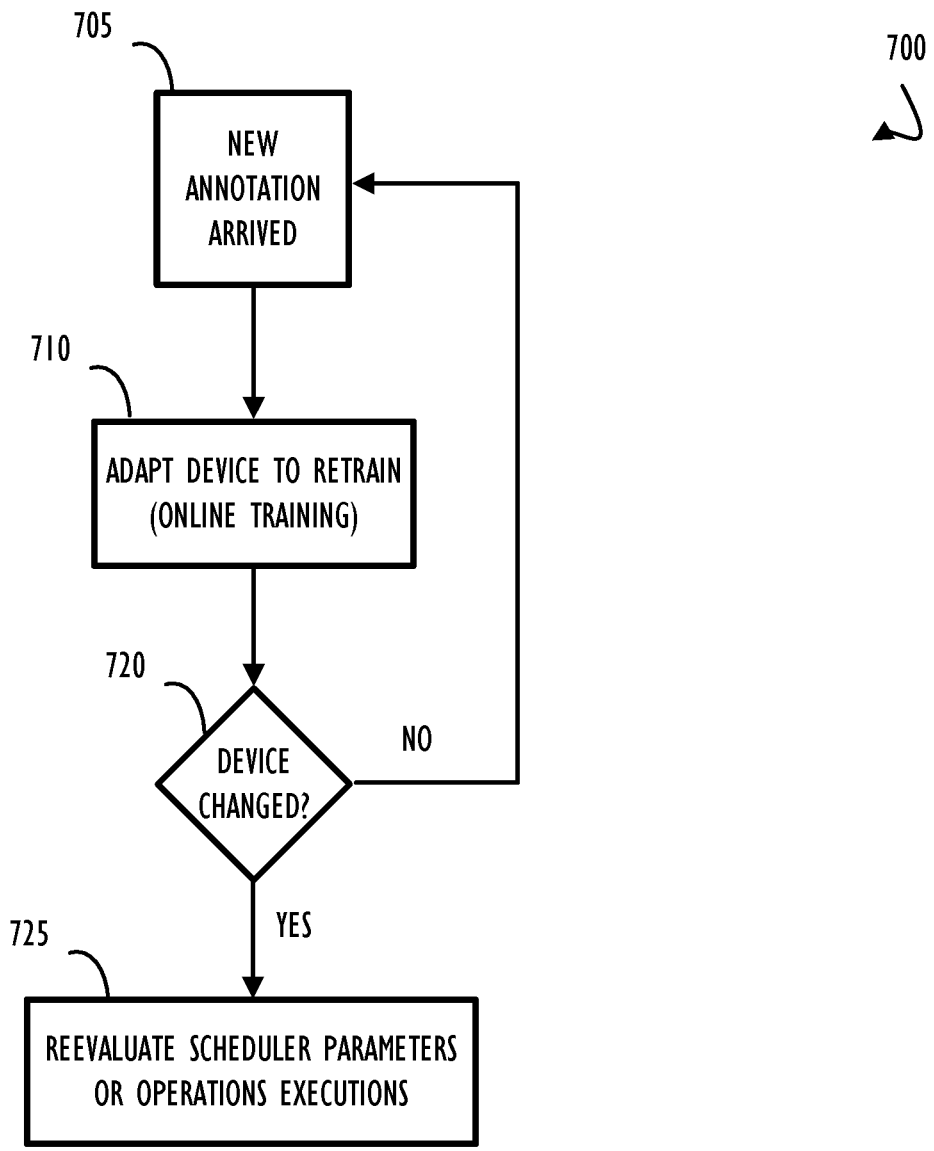
FIG. 7 is a flow diagram depicting one example process for an online training operation (e.g., feed-back loop learning) for an NN processing system, according to one or more disclosed implementations.

In one implementation the adaptation, or learning, could be considered "online." That is, every time there is new information available (for example, an operation has finished and introduced a new annotation) the adaptive device may be configured to update its own configuration parameters (e.g., in anticipation of a next operation/job that may have similar functional requirements as the operation/job attribute associated with the new annotation). Examples of techniques for similar types of adaptive behavior, used in other fields, include online training (e.g., where a test adapts its questions based on previous answers of a testing session) or reinforcement learning (e.g., where focus is altered toward areas of subject matter that appear to be difficult for a trainee). In the context of this disclosure and one example implementation, an adaptive device may be able to react in real-time to anomalous events, such as degradation of performance of the devices due to transient or unforeseen factors (e.g., overheating, memory leak, low throughput, or excess of concurrency). FIG. 7, discussed in more detail below, illustrates a flowchart of an example online training process.

Further, in some implementations, traditional batch training techniques or other heuristics may be used to update the scheduler's components in addition to, or instead of, these online techniques. For example, metrics could be collected over a period of time and machine learning, or even big data, techniques could be used to analyze collected data to perform adjustments. For example, after executing a complete model, and collecting metrics through the annotations, the adaptable device may be retrained with any new data. In this case, algorithms of higher complexity may be used and may represent a trade-off between the time spent to retrain the adaptable device versus ability to react in real-time to intermittent events.

Interfaces to an adaptive device may be implemented as a part of other components of the overall system, such as the operations scheduler or the classifier. It is possible for the adaptive device to be a separate device or a component of a device already participating in processing portions of the NN model. Also, there could be many different devices that are adaptable and have varying degrees of adaptability with respect to each other. Some device may offer a large number of configuration options whereas others do not offer as much flexibility.

In summary, disclosed systems, methods, and devices, represent an improvement to the technical field of NN model processing. In particular, these improvements address advantages in scheduling, efficiency, and overall effectiveness of a system designed to work with different NN models. Some of these advantages may include: a) decreased development time; b) improved performance (both for individual operations and the system as a whole); c) better utilization of hardware; d) run-time optimization and scheduling of NN inference and training; e) establishing feedback loops at the scheduler level; and f) embedding run-time information in NN models using annotation techniques.

Referring to FIG. 1, there is shown a functional block diagram of an NN processing system 100 to represent an example of implementations possible in accordance with this disclosure. NN processing system 100 includes a plurality of NN frameworks 105-1, 105-2, . . . 105-N, a plurality of processing platforms 110-1, 110-2, . . . 110-N upon which to perform the platform dependent execution processing requested by the frameworks, and an operations scheduler module 115. Although shown independently in NN processing system 100, platform dependent operations and executions may be performed on combined capability machines. Some machines configured for hardware dependent execution may have capabilities to combine different execution processing capabilities (e.g. have both a graphics processing unit (GPU) and a dot product engine (DPE), or possibly have multiple cross-compilers installed).

An interoperability formatting module 120 is also shown in FIG. 1. The interoperability formatting module 120 functions, in this example, as a neutral entity which consolidates the inputs from the plurality of NN frameworks 105-1-105-N to provide operation information in an interoperable format to scheduler module 115. NNEF and ONNX are two similar open formats to represent and interchange neural networks among deep learning frameworks and inference engines. At the core, both formats are based on a collection of often used operations from which networks can be built. NNEF and ONNX are just two current open formats that may benefit from concepts disclosed herein. Each of these existing and future interoperable (open) formats may be directly useable or suitable for adaptation in a manner to be utilized with the concepts and implementations of this disclosure.

Scheduler module 115, in turn, may operate to assign operations (e.g., dispatch tasks for execution) received from formatting module 120 to one or more available hardware processing units 110-1, 110-2 . . . 110-N in accordance with classifier information as will be further discussed below. In the example of NN processing system 100, the plurality of example NN frameworks are shown independently as elements 105-1 through 105-N. This is for simplicity of discussion and not to imply that frameworks are always isolated from each other on different processing systems. In some cases, frameworks may have to be isolated or they may be able to be grouped together on a single processing platform based on the restrictions imposed by each individual framework. Examples of NN frameworks, as shown in NN processing system 100, include KAFFE, CNTK, and TENSORFLOW. Other frameworks are also available and possible future frameworks may be developed. Each of these existing and future frameworks may benefit from the concepts and implementations of this disclosure.

Figure 2:
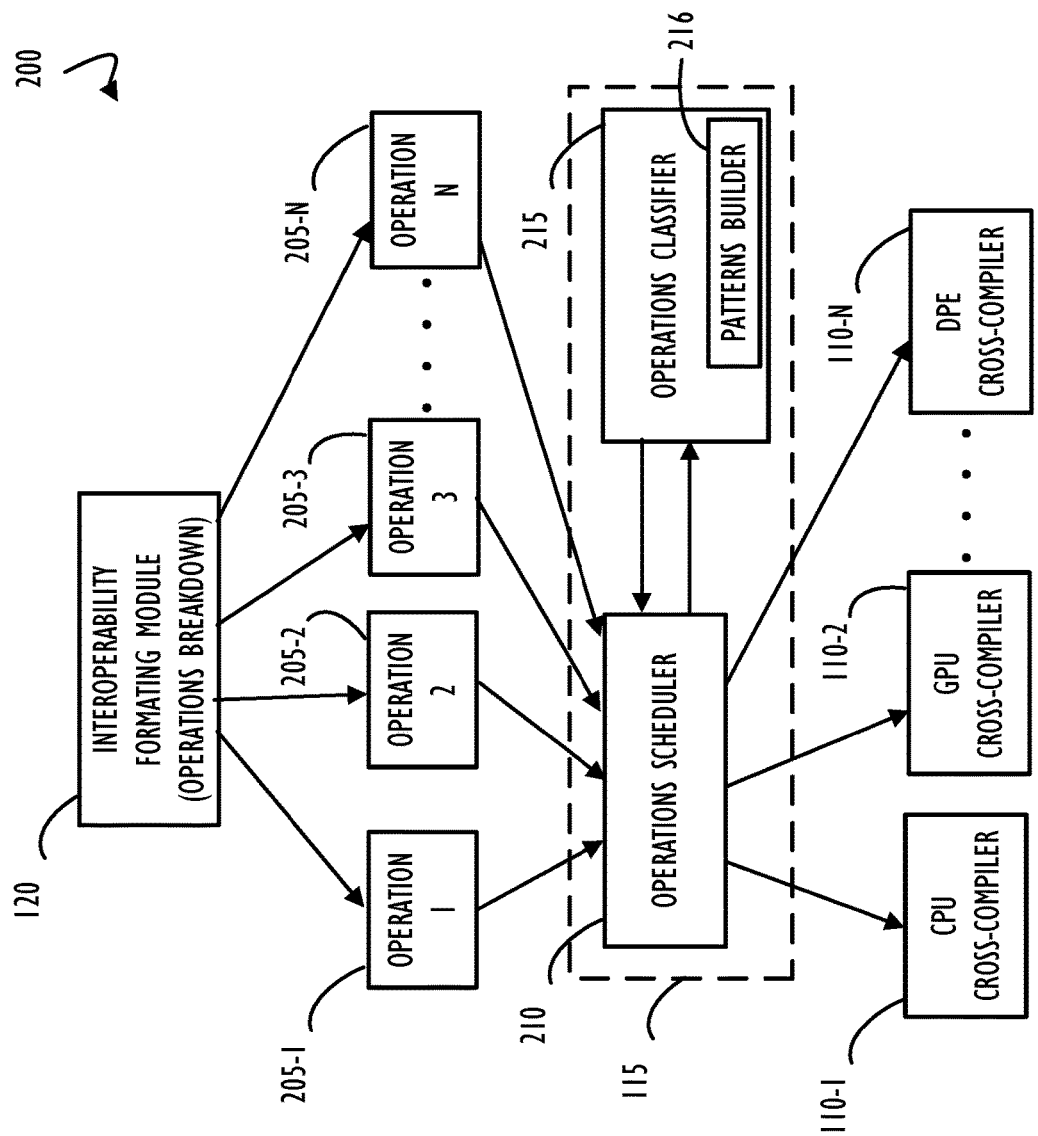
FIG. 2 is a functional block diagram representing a first example of a portion of an NN processing system including an operation scheduler module, an operations classifier, and a plurality of pre-execution processing platforms, according to one or more disclosed implementations.

Referring to FIG. 2, there is shown a functional block diagram of NN processing system 200 including further example details of one possible implementation of operation scheduler module 115. In this example, scheduler module 115, is illustrated to include an operations scheduler 210 and an operations classifier 215. Also, in FIG. 2, patterns builder 216 is illustrated as a sub-function of operations classifier 215. Functionality of the different modules, functional units, and processing elements, as shown in the Figures, is for example only. As will be apparent to those of skill in the art, different functional components may be further subdivided or combined together into a single functional component without departing from the concepts of this disclosure. As shown in FIG. 2, interoperability formatting module 120 breaks down operations (e.g., performs an operations breakdown function to parse and separate out individual functional components referred to as operations such that operations may be executed as individual execution units). One output of interoperability formatting module 120 may be: a) created from the various frameworks 105-1-105-N; b) processed into discrete operations 205-1, 205-2 . . . 205-N; and, c) made available (e.g., forwarded or published) for action (e.g., dispatching, combining, etc.) to scheduler module 115.

The action performed by scheduler module 115 may include short-term or immediate dispatching of tasks for execution on their selected execution environments. In another implementation, the action may simply be to create a schedule for future dispatching of each operation. In the case of schedule creation, it is also possible to provide an interface for review (or update) of the automatically created dispatch schedule that may allow a developer or system administrator to accept or adjust a created execution schedule. After manual adjustment, a confirmation request may be made to allow scheduler module 115 to verify that any manual adjustments remain consistent with annotation information to prevent manual adjustment from causing unwanted results. For example, an alert could identify if an operation may be scheduled for an improper or incapable execution environment or that overall performance may be substantially degraded. Other types of alerts or warnings are possible that may, in some implementations, be overridden by the user.

Operations scheduler 210 operates to assign each operation 205-1, 205-2 . . . 205-N to a preferred processing system 110-1, 110-2 . . . 110-N, at least in part, based on classifier information provided from operations classifier 215. The classification process may be configured to consider various factors including: hardware type, hardware capability, input/output (I/O) overhead between different processing platforms, input/output overhead associated with different operations, and operations affinity to each other and to different hardware capabilities. These are just some of the factors that may be considered. Other factors may be known up front or factors may possibly be learned during actual processing of operations as will be discussed below with reference to FIGS. 4, 5, and 6. In either case, factors may represent predicted or historical execution patterns that patterns builder 216 may use to perform the methods and processing steps outlined herein with respect to assisting operations scheduler 210.

Figure 3:
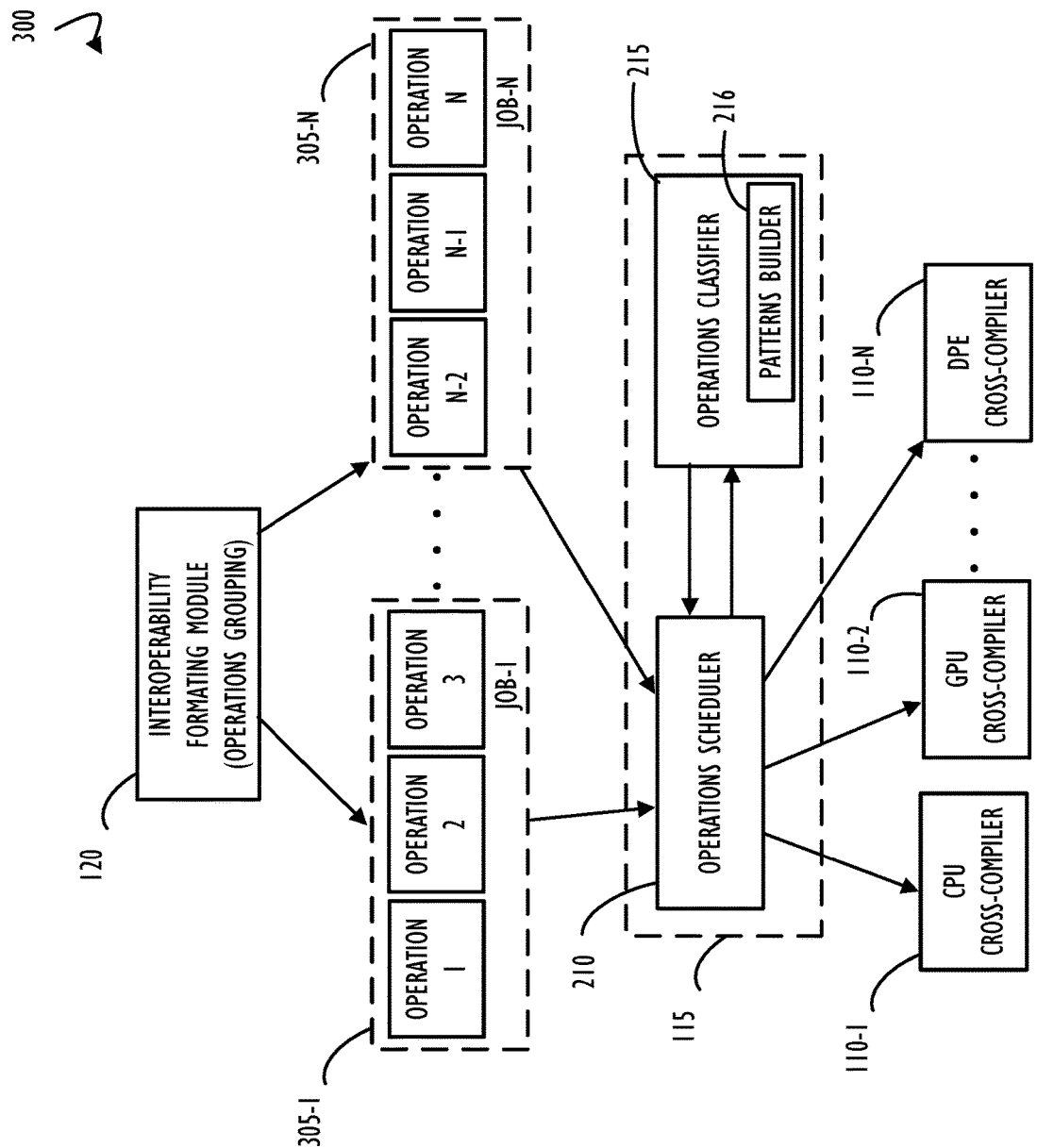
FIG. 3 is a functional block diagram representing a second example of a portion of an NN processing system including an operations scheduler module and a plurality of pre-execution processing platforms, according to one or more disclosed implementations.

Referring to FIG. 3, there is shown a functional block diagram of NN processing system 300, in which operations provided from interoperability formatting module 120 (e.g., processed as discussed for FIG. 2) have been further grouped into groups, referred to as jobs as shown by elements 305-1-305-N. Each job may include one or more individual operations which are related in such a way as to be considered collectively (e.g., for dispatching or further optimization) by scheduler module 115. Grouping individual operations into jobs may decrease the overall complexity of tracking completion of tasks by reducing the overall number of individual units of work to track. Further, grouping of operations into jobs based on their affinity to each other may result in reduced overhead (e.g., initialization cost) or reduced throughput (e.g., input/output efficiency) while processing the overall NN model.

Figure 4:
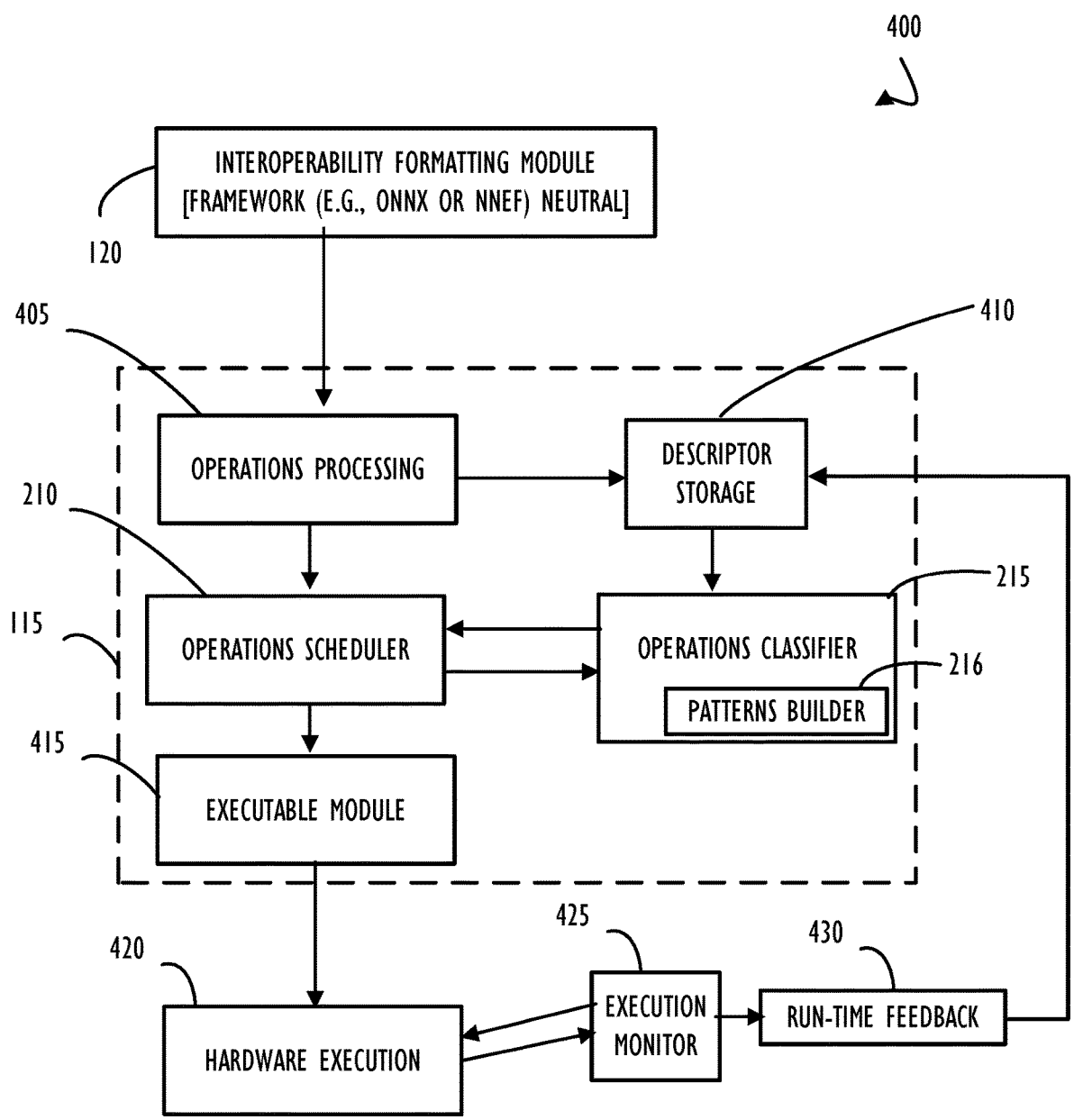
FIG. 4 is a functional block diagram of a third example of a portion of an NN processing system including an operational scheduler module, components associated with the operational scheduler module, and a possible feedback loop, according to one or more disclosed implementations.

Referring to FIG. 4, there is shown a functional block diagram of NN processing system 400 showing additional details of scheduler module 115 and a possible feedback loop (line from run-time feedback 430 to descriptor storage 410). This feedback loop may be used to provide information about actual run-time metrics that may be used to tune the scheduler module 115. Tuning based on actual execution criteria (e.g., monitored metrics and analysis thereof) may provide another aspect of tuning that can be used to augment information determined by pre-execution analysis. As described above, operations processing 405 may include creating discrete operations from an interoperable format for use by scheduler module 115. In FIG. 4, operations scheduler 210 is illustrated to interface with operations processing 405, executable module 415, and operations classifier 215 (which includes patterns builder 216). Executable module 415 represents an execution unit dispatched by operations scheduler 210 to a hardware execution 420 environment. As explained above, different types of hardware execution 420 are possible and an executable module 415 may be dispatched to a hardware execution 420 environment that matches requirements (as defined by annotation information in descriptor storage 410) based on algorithms executed by operations scheduler 210. As shown, descriptor storage 410 may be used to store and correlate annotations (and run-time feedback 430) for each operation or set of operations (e.g., job 305 of FIG. 3).

A descriptor that may be created for each operation and stored in descriptor storage 410 may include elements to maintain an operation's description, such as operation type, operation complexity, the recommended hardware settings to configure for a proper run-time environment, date being updated and/or accessed, and so on. The descriptor may also include execution-specific statistical data, for example, the time necessary to produce the output for given set of hardware settings, resources, other overhead used, and so on.

Execution monitor 425 represents either an external monitor process that "watches" execution criteria on a processor or may represent internal metrics provided by an operation (e.g., using embedded trace functions or other actions to self-report execution metrics). In this manner an execution environment, such as NN processing system 100 may automatically improve its operations over time, based in part, on proper allocation of operations and feedback for future automated (or manual) tuning. In one example, patterns builder 216 may identify execution criteria metrics in descriptor storage 410 that originated from execution monitor 425 and alter overall scheduling determination criteria based on those metrics.

Figure 5:
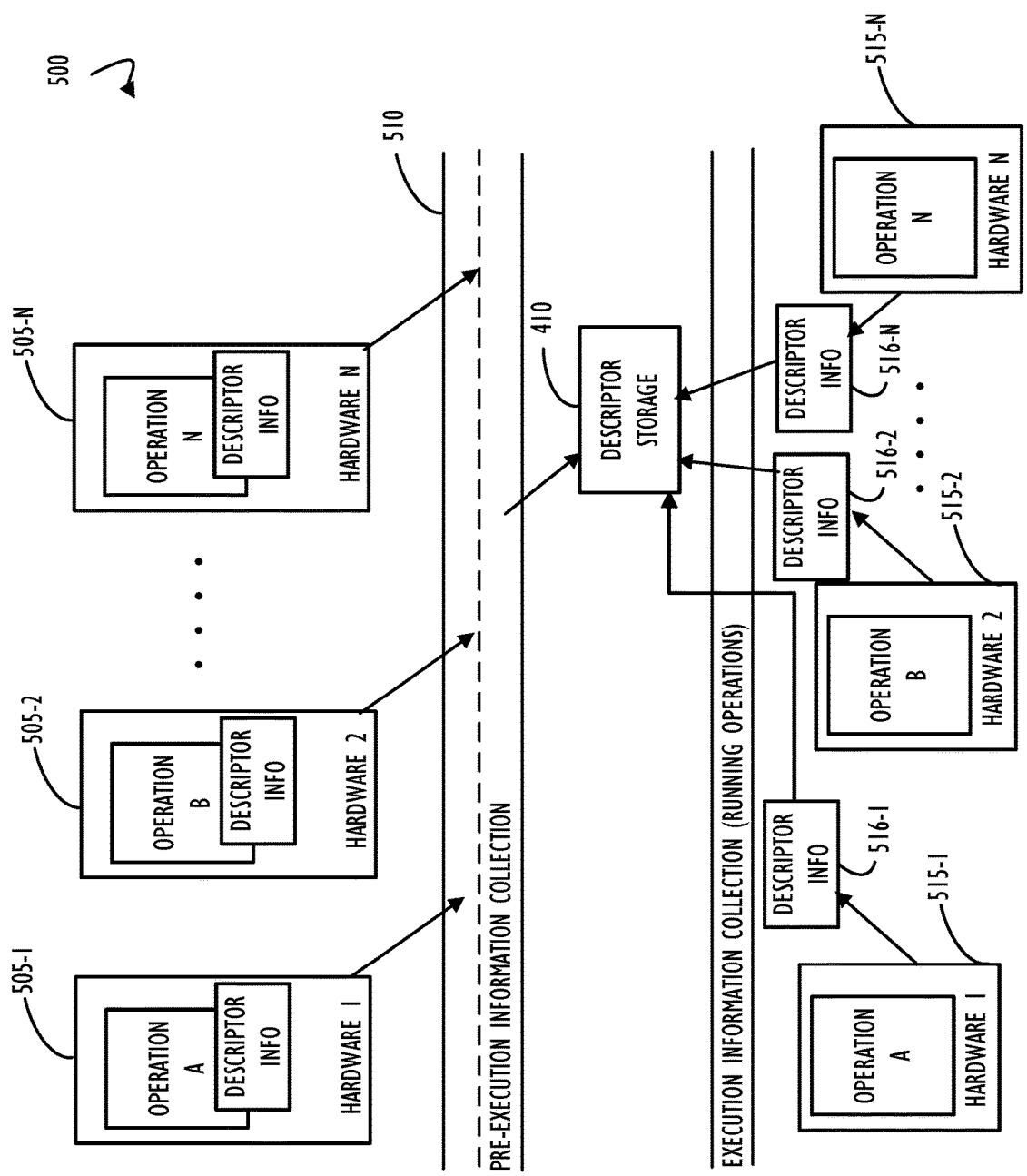
FIG. 5 is a functional block diagram of a portion of an NN processing system including one possible communication mechanism between a plurality of execution processing platforms and descriptor storage, according to one or more disclosed implementations.

Referring to FIG. 5, there is shown a functional block diagram of a portion of an NN processing system 500 including one possible communication mechanism between a plurality of processing platforms, according to one or more disclosed implementations. In this example, processing systems refer to both pre-execution processing systems 505-1, 505-1, . . . 505-N, and execution platforms 515-1, 515-2, . . . 515-N. Pre-execution processing refers to work performed with pre-execution code (e.g., interoperable format processing performed above line 510) to identify discrete operations and possibly group them into jobs as discussed above as well as preparation of the code for execution (e.g., compiling, or cross-compiling for a specific hardware). Execution processing refers to actual run-time execution of the NN model. As shown, information from both of these different types of processing may be provided to descriptor storage 410. In one example, a publish-subscribe methodology may be used where information is published to the descriptor storage for later consumption by other processing systems as needed. Of course, information could be transferred directly in some implementations, but in a publish-subscribe implementation, scalability concerns may be minimized. In short, the example of NN processing system 500 illustrates that descriptor storage 410 may be configured as a centralized repository to provide information (descriptor info 516-1, 516-2, . . . 516-N) to other parts of an overall system.

Figure 6:
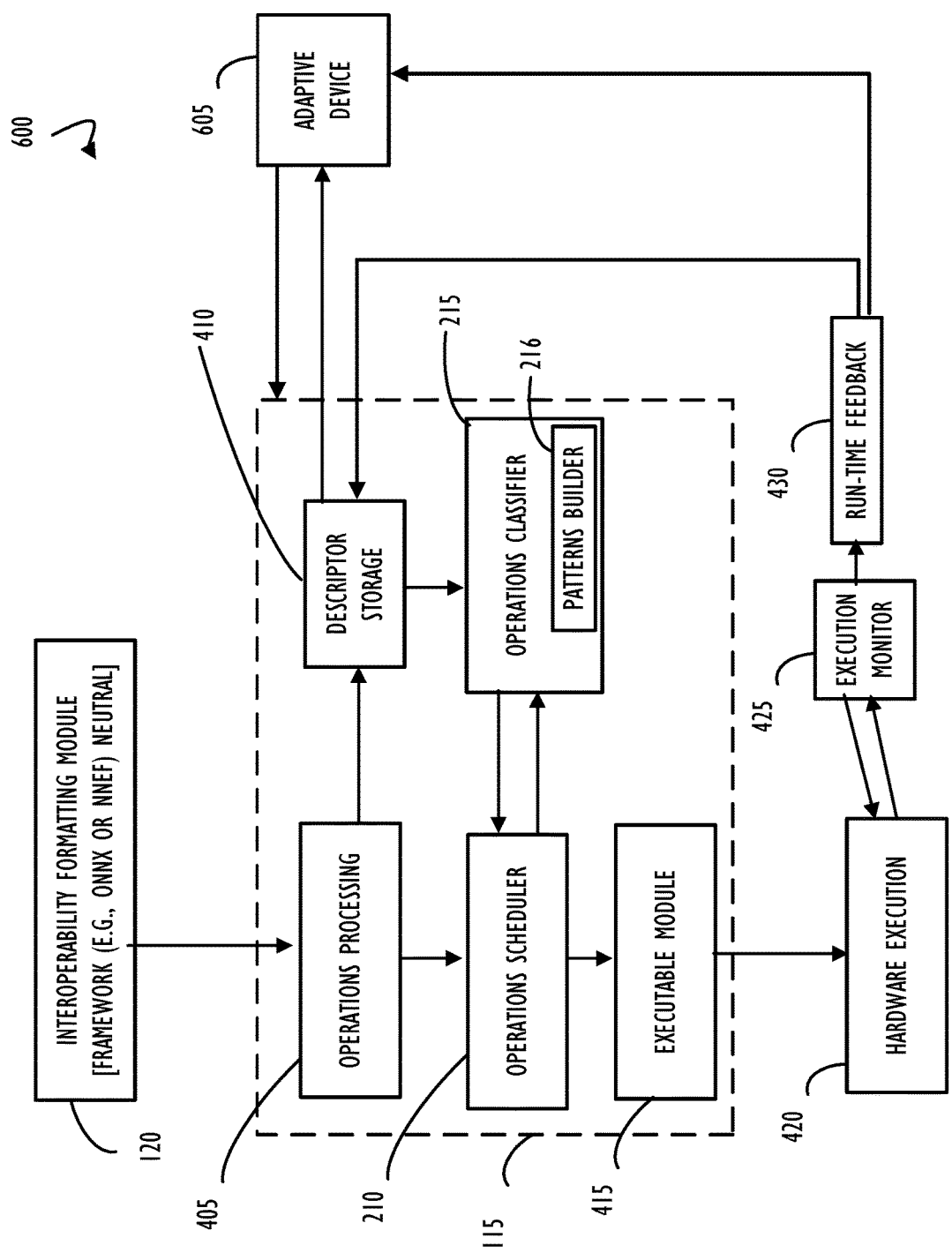
FIG. 6 is a functional block diagram of a portion of an NN processing system including an adaptive device interfacing with an operation scheduler module, and a plurality of associated processing platforms, according to one or more disclosed implementations.

Referring to FIG. 6, building on the example of FIG. 5, a functional block diagram represents a portion of an NN processing system 600. This portion of NN processing system 600 introduces an adaptive device 605 interfacing with a scheduler module 115, and a plurality of associated processing platforms, according to one or more disclosed implementations. As shown, adaptive device 605 may be configured to receive input in the form of run-time feedback 430 and adapt itself (e.g., alter its own configuration settings) to perform hardware execution processing for the NN model. In some implementations, adaptive device may also provide further input to scheduler module 115. This information may be to inform scheduler module 115 of the change in configuration of adaptive device 605 such that future scheduling may take into account the updated configuration. In some cases, output from adaptive device 605 may be provided to a system administrator when manual intervention may be desired to alter capabilities of adaptive device 605 (e.g., add more memory).

Referring to FIG. 7, there is shown a flow diagram depicting one example process 700 (e.g., workflow) for an online training operation (e.g., feed-back loop learning) for an NN processing system, according to one or more disclosed implementations. Process 700 begins at block 705 where a new annotation is detected. For example, a descriptor may be added or updated in descriptor storage that may affect an adaptive device (e.g., adaptive device 605 of FIG. 6) or may be received directly at the adaptive device from run-time feedback 430. Block 710 indicates that the adaptive device may attempt to retrain based on the new information.

Decision 720 indicates that a determination may be made as to if any changes have been made to the adaptive device. If not, the NO prong of decision 720, flow returns to block 705 to wait for a next update. If the adaptive device is altered, the YES prong of decision 720, flow continues to block 725 where schedule parameters may be reevaluated to determine if they should be changed for future scheduling functions or if a currently executing operation should be pre-empted and moved to another execution environment. For example, the adaptive device may have changed a configuration setting such that it should take over processing for an already dispatched operation (or job).

Figure 8A:
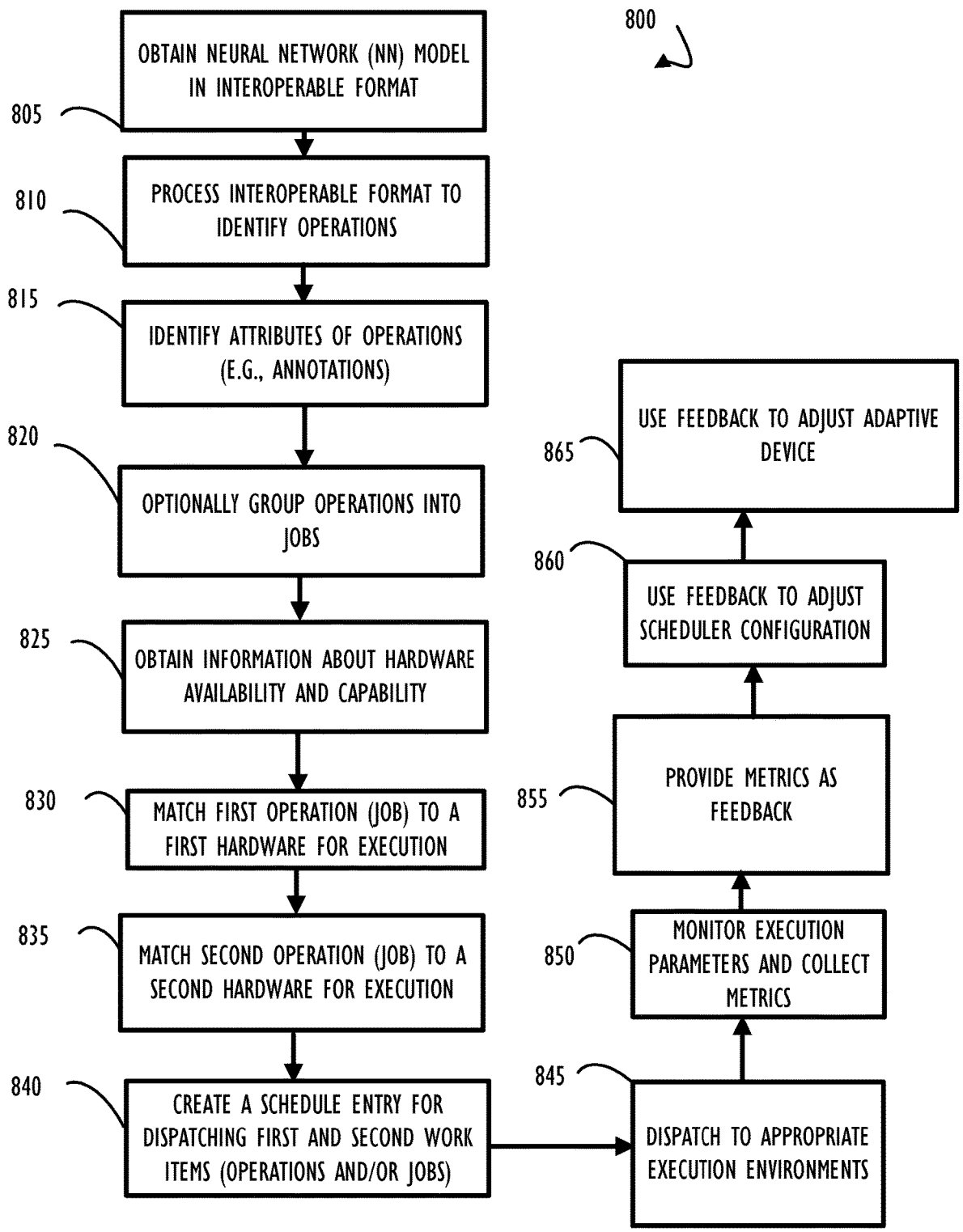
FIG. 8A represents a first example method that may be used to analyze, adapt, and optimize operations scheduling, using an intermediate interoperable format, across a plurality of processing platforms, according to one or more disclosed embodiments.
Figure 8B:
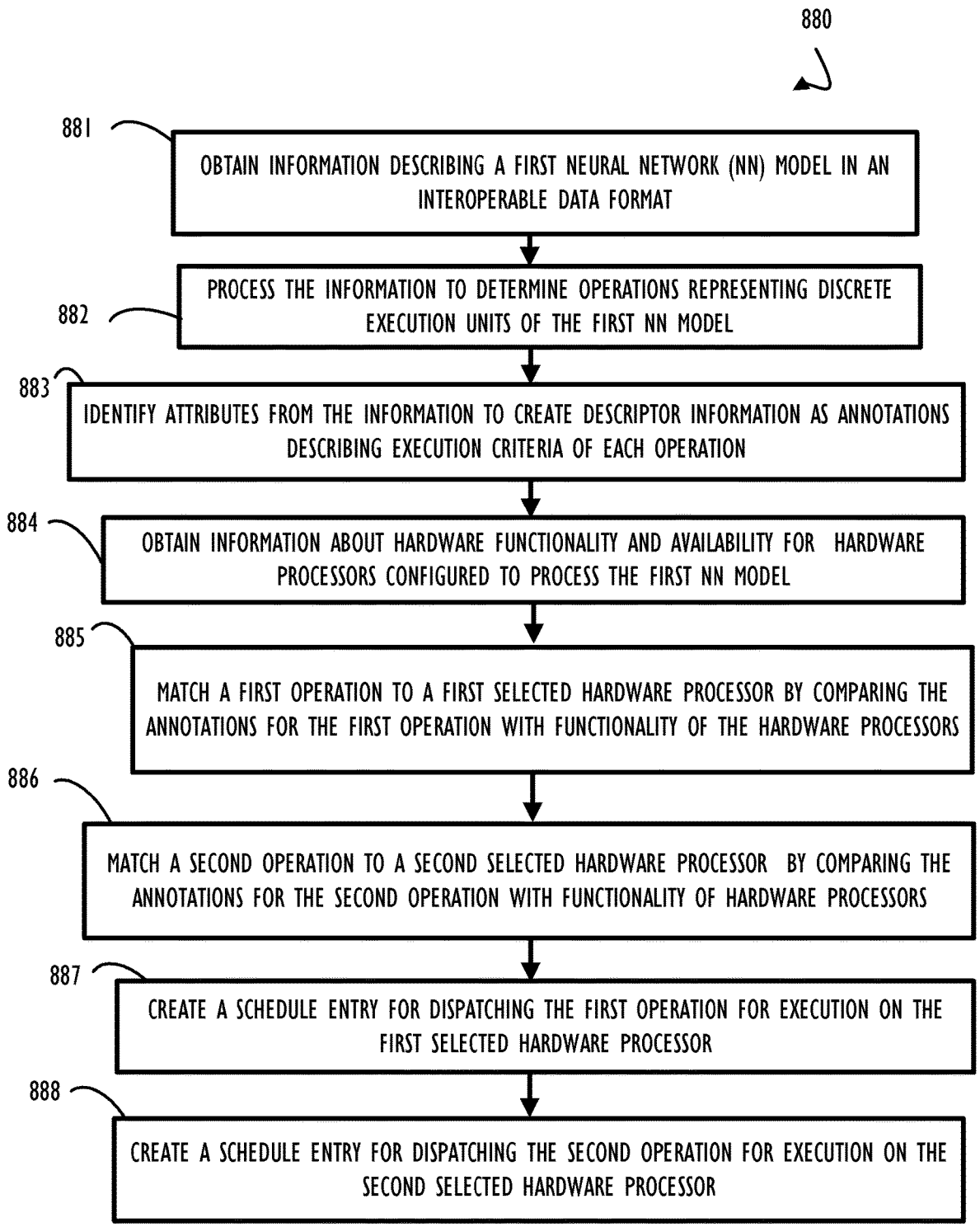
FIG. 8B represents a second example method that may be used to analyze, adapt, and optimize operations scheduling, using an intermediate interoperable format, across a plurality of processing platforms, according to one or more disclosed embodiments.

FIGS. 8A and 8B represent respective example methods that may be used to analyze, adapt, and optimize operations scheduling, using an intermediate interoperable format, across a plurality of processing platforms, according to one or more disclosed embodiments. FIG. 8A illustrates method 800 which begins at block 805 with obtaining an NN model in interoperable format. Block 810 indicates that the interoperable format may be processed to identify discrete operations that may represent functional units of work. Block 815 indicates that attributes of each operation may be identified as possible annotations to the information about the interoperable format NN model. Block 820 indicates that operations may be optionally grouped into jobs. Block 825 indicates that information about hardware availability and capabilities may be obtained. Block 830 indicates that a match between a first operation/job and a first hardware execution platform may be identified. Block 835 indicates that this matching action may be repeated for a second operation/job. Block 840 indicates that a schedule entry for immediate or future dispatching of a work item on a selected hardware execution environment may be created. Block 845 indicates that the work items are dispatched for execution. Block 850 indicates that a monitor function, either internal monitoring provided by work items or using an external monitor, may be used to collect run-time metrics. Block 855 indicates that metrics may be provided as feedback. Block 860 indicates that this feedback may be used to adjust a scheduler (e.g., scheduler module 115) configuration. Block 865 indicates that this feedback may be used to adjust the disclosed adaptive device.

FIG. 8B illustrates method 880 which begins at block 881 with obtaining an NN model in interoperable format. Block 882 indicates that the interoperable format may be processed to identify discrete operations that may represent functional units of work. Block 883 indicates that attributes of each operation may be identified as possible annotations to the information about the interoperable format NN model. Block 884 indicates that information about hardware availability and capabilities may be obtained. Block 885 indicates that a match between a first operation/job and a first hardware execution platform may be identified. Block 886 indicates that this matching action may be repeated for a second operation/job. Block 887 indicates that a schedule entry for immediate or future dispatching of the first operation on a selected hardware execution environment may be created. Block 888 indicates that a schedule entry for immediate or future dispatching of the second operation on a selected hardware execution environment may be created.

Figure 9:
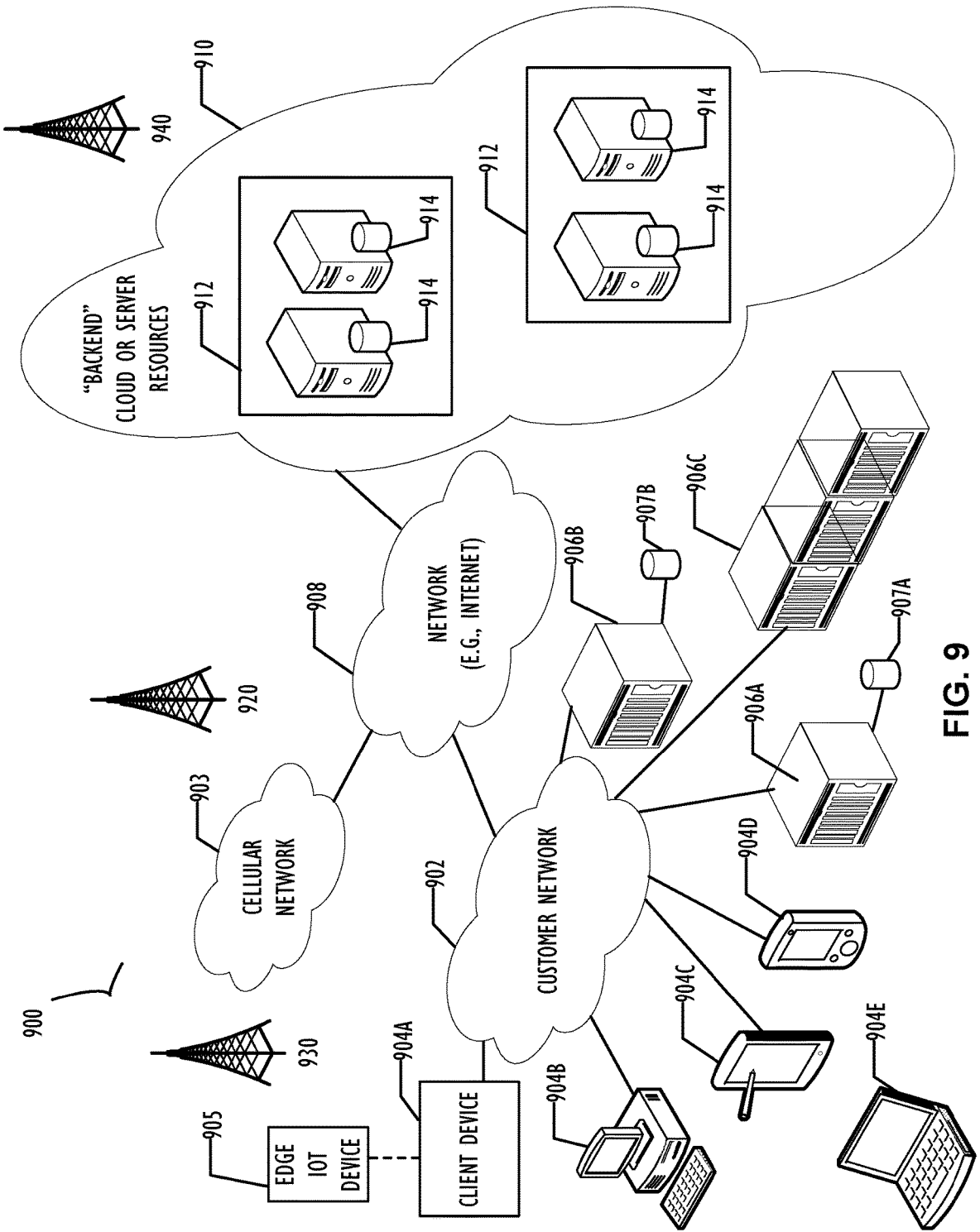
FIG. 9 represents a computer network infrastructure that may be used to implement all or part of the disclosed NN processing systems or provide information flow between the NN processing system and other computer networks, according to one or more disclosed embodiments.

FIG. 9 represents a computer network infrastructure 900 that may be used to implement all or part of the disclosed NN processing systems or provide information flow between the NN processing system and other computer networks, according to one or more disclosed embodiment. Network infrastructure 900 includes a set of networks where embodiments of the present disclosure may operate. Network infrastructure 900 comprises a customer network 902, network 908, cellular network 903, and a cloud service provider network 910. In one embodiment, the customer network 902 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 902 represents an enterprise network that could include or be communicatively coupled to one or more local area networks (LANs), virtual networks, data centers and/or other remote networks (e.g., 908, 910). In the context of the present disclosure, customer network 902 may include an NN processing system such as those described above.

As shown in FIG. 9, customer network 902 may be connected to one or more client devices 904A-E and allow the client devices 904A-E to communicate with each other and/or with cloud service provider network 910, via network 908 (e.g., Internet). Client devices 904A-E may be computing systems such as desktop computer 904B, tablet computer 904C, mobile phone 904D, laptop computer (shown as wireless) 904E, and/or other types of computing systems generically shown as client device 904A.

Network infrastructure 900 may also include other types of devices generally referred to as Internet of Things (IoT) (e.g., edge IOT device 905) that may be configured to send and receive information via a network to access cloud computing services or interact with a remote web browser application (e.g., to receive configuration information).

FIG. 9 also illustrates that customer network 902 includes local compute resources 906A-C that may include a server, access point, router, or other device configured to provide for local computational resources and/or facilitate communication amongst networks and devices. For example, local compute resources 906A-C may be one or more physical local hardware devices, such as the different configurations of NN processing systems outlined above. Local compute resources 906A-C may also facilitate communication between other external applications, data sources (e.g., 907A and 907B), and services, and customer network 902.

In network infrastructure 900, local compute resource 906A represents an NN functional processing system server with singular access to data source 907A. That is, 907A is private data to compute resource 906A in this example. Accordingly, any operation that requires access to data source 907A must execute on compute resource 906A. Annotations may indicate that an operation/job requires access to this data source and the scheduler function would therefore ensure that the operation/job is dispatched to this resource. Also, in this example, data source 907B is dedicated to compute resource 906B.

Local compute resource 906C illustrates a possible NN model processing system cluster with three nodes. Of course, any number of nodes is possible, but three are shown in this example for illustrative purposes. In the context of the current disclosure, this example illustrates that those three nodes may be considered equivalent to each other as far as capabilities to perform operations designated for compute resource 906C. It is noted that internal load balancing mechanisms (e.g., cluster load balancing) may further assist the overall operation assignment techniques used for optimal operation/job execution according to disclosed embodiments.

Network infrastructure 900 also includes cellular network 903 for use with mobile communication devices. Mobile cellular networks support mobile phones and many other types of mobile devices such as laptops etc. Mobile devices in network infrastructure 900 are illustrated as mobile phone 904D, laptop computer 904E, and tablet computer 904C. A mobile device such as mobile phone 904D may interact with one or more mobile provider networks as the mobile device moves, typically interacting with a plurality of mobile network towers 920, 930, and 940 for connecting to the cellular network 903.

Although referred to as a cellular network in FIG. 9, a mobile device may interact with towers of more than one provider network, as well as with multiple non-cellular devices such as wireless access points and routers (e.g., local compute resources 906A-C). In addition, the mobile devices may interact with other mobile devices or with non-mobile devices such as desktop computer 904B and various types of client device 904A for desired services. Although not specifically illustrated in FIG. 9, customer network 902 may also include a dedicated network device (e.g., gateway or router) or a combination of network devices (not shown) that implement a customer firewall or intrusion protection system. These types of devices may be configured to provide an interface to an NN processing system of this disclosure.

FIG. 9 illustrates that customer network 902 is coupled to a network 908. Network 908 may include one or more computing networks available today, such as other LANs, wide area networks (WAN), the Internet, and/or other remote networks, in order to transfer data between client devices 904A-D and cloud service provider network 910. Each of the computing networks within network 908 may contain wired and/or wireless programmable devices that operate in the electrical and/or optical domain.

In FIG. 9, cloud service provider network 910 is illustrated as a remote network (e.g., a cloud network) that is able to communicate with client devices 904A-E via customer network 902 and network 908. The cloud service provider network 910 acts as a platform that provides additional computing resources to the client devices 904A-E and/or customer network 902. For example, by utilizing the cloud service provider network 910, users of customer network 902 may be able to augment an NN processing system with temporary or additional remote compute resources. In one embodiment, cloud service provider network 910 includes one or more data centers 912 with one or more server instances 914.

Figure 10:
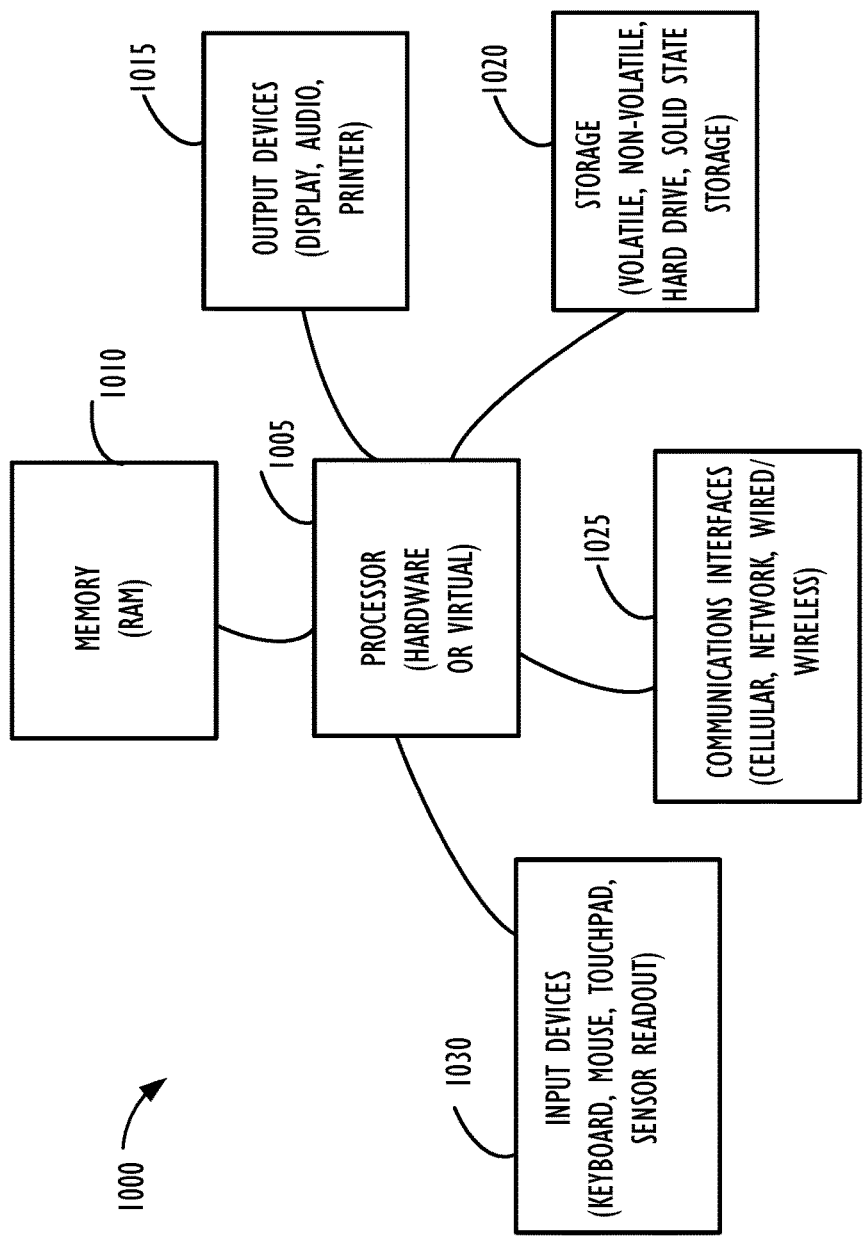
FIG. 10 illustrates a computer processing device that may be used to implement the functions, modules, processing platforms, execution platforms, communication devices, and other methods and processes of this disclosure.

FIG. 10 illustrates a computer processing device 1000 that may be used to implement the functions, modules, processing platforms, execution platforms, communication devices, and other methods and processes of this disclosure. For example, computing device 1000 illustrated in FIG. 10 could represent a client device or a physical server device and include either hardware or virtual processor(s) depending on the level of abstraction of the computing device. In some instances (without abstraction), computing device 1000 and its elements, as shown in FIG. 10, each relate to physical hardware. Alternatively, in some instances one, more, or all of the elements could be implemented using emulators or virtual machines as levels of abstraction. In any case, no matter how many levels of abstraction away from the physical hardware, computing device 1000 at its lowest level may be implemented on physical hardware.

As also shown in FIG. 10, computing device 1000 may include one or more input devices 1030, such as a keyboard, mouse, touchpad, or sensor readout (e.g., biometric scanner) and one or more output devices 1015, such as displays, speakers for audio, or printers. Some devices may be configured as input/output devices also (e.g., a network interface or touchscreen display).

Computing device 1000 may also include communications interfaces 1025, such as a network communication unit that could include a wired communication component and/or a wireless communications component, which may be communicatively coupled to processor 1005. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 10, computing device 1000 includes a processing element such as processor 1005 that contains one or more hardware processors, where each hardware processor may have a single or multiple processor cores. In one embodiment, the processor 1005 may include at least one shared cache that stores data (e.g., computing instructions) that are utilized by one or more other components of processor 1005. For example, the shared cache may be a locally cached data stored in a memory for faster access by components of the processing elements that make up processor 1005. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 10, the processing elements that make up processor 1005 may also include one or more of other types of hardware processing components, such as graphics processing units (GPU), application specific integrated circuits (ASICs), field-programmable gate arrays (FPGAs), and/or digital signal processors (DSPs).

FIG. 10 illustrates that memory 1010 may be operatively and communicatively coupled to processor 1005. Memory 1010 may be a non-transitory medium configured to store various types of data. For example, memory 1010 may include one or more storage devices 1020 that comprise a non-volatile storage device and/or volatile memory. Volatile memory, such as random-access memory (RAM), can be any suitable non-permanent storage device. The non-volatile storage devices 1020 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 1020 may be used to store overflow data if allocated RAM is not large enough to hold all working data. The non-volatile storage devices 1020 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1005. In one embodiment, the compiling process of the software program may transform program code written in a programming language to another computer language such that the processor 1005 is able to execute the programming code. For example, the compiling process of the software program may generate an executable program that provides encoded instructions (e.g., machine code instructions) for processor 1005 to accomplish specific, non-generic, particular computing functions.

After the compiling process, the encoded instructions may then be loaded as computer executable instructions or process steps to processor 1005 from storage device 1020, from memory 1010, and/or embedded within processor 1005 (e.g., via a cache or on-board ROM). Processor 1005 may be configured to execute the stored instructions or process steps in order to perform instructions or process steps to transform the computing device into a non-generic, particular, specially programmed machine or apparatus. Stored data, e.g., data stored by a storage device 1020, may be accessed by processor 1005 during the execution of computer executable instructions or process steps to instruct one or more components within the computing device 1000.

A user interface (e.g., output devices 1015 and input devices 1030) can include a display, positional input device (such as a mouse, touchpad, touchscreen, or the like), keyboard, or other forms of user input and output devices. The user interface components may be communicatively coupled to processor 1005. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 1000 may comprise other components well known in the art, such as sensors, powers sources, and/or analog-to-digital converters, not explicitly shown in FIG. 10.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method comprising:
   obtaining information describing a first neural network (NN) model in an interoperable data format;
   processing the information to determine a plurality of operations representing discrete execution units of the first NN model;

identifying attributes from the information to create descriptor information as annotations describing execution criteria of each operation from the plurality of operations;

obtaining information about hardware functionality and availability for a plurality of hardware processors configured to process the first NN model;

matching a first operation to a first selected hardware processor from the plurality of hardware processors, in part, by comparing the annotations for the first operation with functionality of the plurality of hardware processors;

matching a second operation to a second selected hardware processor from the plurality of hardware processors, in part, by comparing the annotations for the second operation with functionality of the plurality of hardware processors;

creating a first schedule entry and executing the first operation on the first selected hardware processor; and creating a second schedule entry and executing the second operation on the second selected hardware processor, wherein hardware performance capabilities of the first selected hardware processor and the second selected hardware processor are different, at least one of the annotations for the first operation align with capabilities of the first selected hardware processor not available for the second selected hardware processor, and at least one of the annotations for the second operation align with capabilities of the second selected hardware processor not available for the first selected hardware processor.

2. The computer-implemented method of claim 1, wherein creating the first and second schedule entries comprises dispatching the first and second schedule entries upon completion of creating schedule entries for the plurality of operations.

3. The computer-implemented method of claim 1, wherein the first operation is dispatched for execution on the first selected hardware processor prior to creating the second schedule entry for dispatching the second operation.

4. The computer-implemented method of claim 1, further comprising:

identifying a third operation as having an affinity with the first operation based, in part, on the annotations associated with the first and third operations;

combining the first operation with the third operation to result in a job including both the first operation and the third operation; and treating the job as the first operation for matching, scheduling, and execution.

5. The computer-implemented method of claim 1, further comprising:

optimizing the interoperable format in conjunction with processing the information to determine the plurality of operations.

6. The computer-implemented method of claim 1, further comprising:

determining one or more affinities across a subset of the plurality of operations, the subset representing a group of individual operations;

combining the subset into one or more jobs based on the affinities representing possible efficiencies for execution as determined from the annotations for each individual operation; and using a composite of the annotations for each individual operation to represent annotations for the one or more jobs for matching, scheduling, and execution, wherein a single job and its corresponding composite annotations represent a single operation with respect to further processing.

7. The computer-implemented method of claim 6, wherein the one or more affinities represent information indicating each of the group of individual operations requires access to a limited access system resource.

8. The computer-implemented method of claim 7, wherein the limited access system resource comprises a data resource having limited access across a network of compute resources designated to perform functions for processing the first NN model.

9. The computer-implemented method of claim 1, further comprising:

converting the interoperable data format into a run-time executable format for a specific compute resource based, in part, on the run-time executable format matching hardware criteria of the specific compute resource.

10. The computer-implemented method of claim 9, wherein converting comprises cross-compiling to create at least a portion of the run-time executable format.

11. The computer-implemented method of claim 1, further comprising:

monitoring execution parameters of previously dispatched operations or jobs to collect monitoring information;

updating annotation information based on analysis of the monitoring information to create updated annotation information; and using the updated annotation information for processing a second NN model.

12. The computer-implemented method of claim 1, further comprising:

monitoring execution parameters of previously dispatched operations or jobs to collect monitoring information; and updating scheduling criteria used by a scheduler based on analysis of the monitoring information to adjust future selection of hardware processors.

13. The computer-implemented method of claim 1, further comprising:

monitoring execution parameters of previously dispatched operations or jobs to collect monitoring information;

updating configuration settings of an adaptive device based on analysis of the monitoring information to create an updated adaptive device; and using the updated adaptive device for executing at least a portion of a second NN model.

14. A non-transitory computer readable medium comprising computer executable instructions stored thereon that when executed by one or more processing units, perform a method to provide a neural network (NN) operation creation and scheduling function, the method comprising:

obtaining information describing a first neural network (NN) model in an interoperable data format;

processing the information to determine a plurality of operations representing discrete execution units of the first NN model;

identifying attributes from the information to create descriptor information as annotations describing execution criteria of each operation from the plurality of operations;

obtaining information about hardware functionality and availability for a plurality of hardware processors configured to process the first NN model;

matching a first operation to a first selected hardware processor from the plurality of hardware processors, in part, by comparing the annotations for the first operation with functionality of the plurality of hardware processors;

matching a second operation to a second selected hardware processor from the plurality of hardware processors, in part, by comparing the annotations for the second operation with functionality of the plurality of hardware processors;

creating a first schedule entry and executing the first operation on the first selected hardware processor; and creating a second schedule entry and executing the second operation on the second selected hardware processor, wherein hardware performance capabilities of the first selected hardware processor and the second selected hardware processor are different, at least one of the annotations for the first operation align with capabilities of the first selected hardware processor not available for the second selected hardware processor, and at least one of the annotations for the second operation align with capabilities of the second selected hardware processor not available for the first selected hardware processor.

15. The non-transitory computer readable medium of claim 14, wherein the method further comprises:

identifying a third operation as having an affinity with the first operation based, in part, on the annotations associated with the first and third operations;

combining the first operation with the third operation to result in a job including both the first operation and the third operation; and treating the job as the first operation for matching, scheduling, and execution.

16. The non-transitory computer readable medium of claim 14, wherein the method further comprises:

optimizing the interoperable format in conjunction with processing the information to determine the plurality of operations.

17. The non-transitory computer readable medium of claim 14, wherein the method further comprises:

determining one or more affinities across a subset of the plurality of operations, the subset representing a group of individual operations;

combining the subset into one or more jobs based on the affinities representing possible efficiencies for execution as determined from the annotations for each individual operation; and using a composite of the annotations for each individual operation to represent annotations for the one or more jobs for matching, scheduling, and execution, wherein a single job and its corresponding composite annotations represent a single operation with respect to further processing.

18. A computer system, comprising:
a network communications interface;
a memory; and
one or more processing units, communicatively coupled to the memory and the network communications interface, wherein the memory stores instructions, that when executed by the one or more processing units, cause the one or more processing units to provide a neural network (NN) operation creation and scheduling function, the NN operation creation and scheduling function configured to:

obtain information describing a first neural network (NN) model in an interoperable data format;

process the information to determine a plurality of operations representing discrete execution units of the first NN model;

identify attributes from the information to create descriptor information as annotations describing execution criteria of each operation from the plurality of operations;

obtain information about hardware functionality and availability for a plurality of hardware processors configured to process the first NN model;

match a first operation to a first selected hardware processor from the plurality of hardware processors, in part, by comparing the annotations for the first operation with functionality of the plurality of hardware processors;

match a second operation to a second selected hardware processor from the plurality of hardware processors, in part, by comparing the annotations for the second operation with functionality of the plurality of hardware processors;

create a first schedule entry and executing the first operation on the first selected hardware processor; and create a second schedule entry and executing the second operation on the second selected hardware processor, wherein hardware performance capabilities of the first selected hardware processor and the second selected hardware processor are different, at least one of the annotations for the first operation align with capabilities of the first selected hardware processor not available for the second selected hardware processor, and at least one of the annotations for the second operation align with capabilities of the second selected hardware processor not available for the first selected hardware processor.

19. The computer system of claim 18, wherein the NN operation creation and scheduling function is further configured to:

identify a third operation as having an affinity with the first operation based, in part, on the annotations associated with the first and third operations;

combine the first operation with the third operation to result in a job including both the first operation and the third operation; and treat the job as the first operation for matching, scheduling, and execution.

20. The computer system of claim 18, wherein the NN operation creation and scheduling function is further configured to:

optimize the interoperable format in conjunction with processing the information to determine the plurality of operations.

* * * * *